C. A. SINGER.
TRAFFIC DIRECTING SIGNAL FOR VEHICLES.
APPLICATION FILED SEPT. 27, 1915.
1,240,380.
Patented Sept. 18, 1917.
2 SHEETS—SHEET 1.
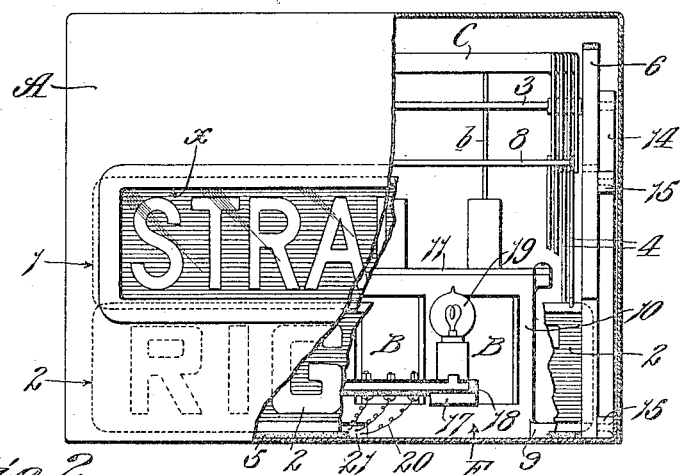
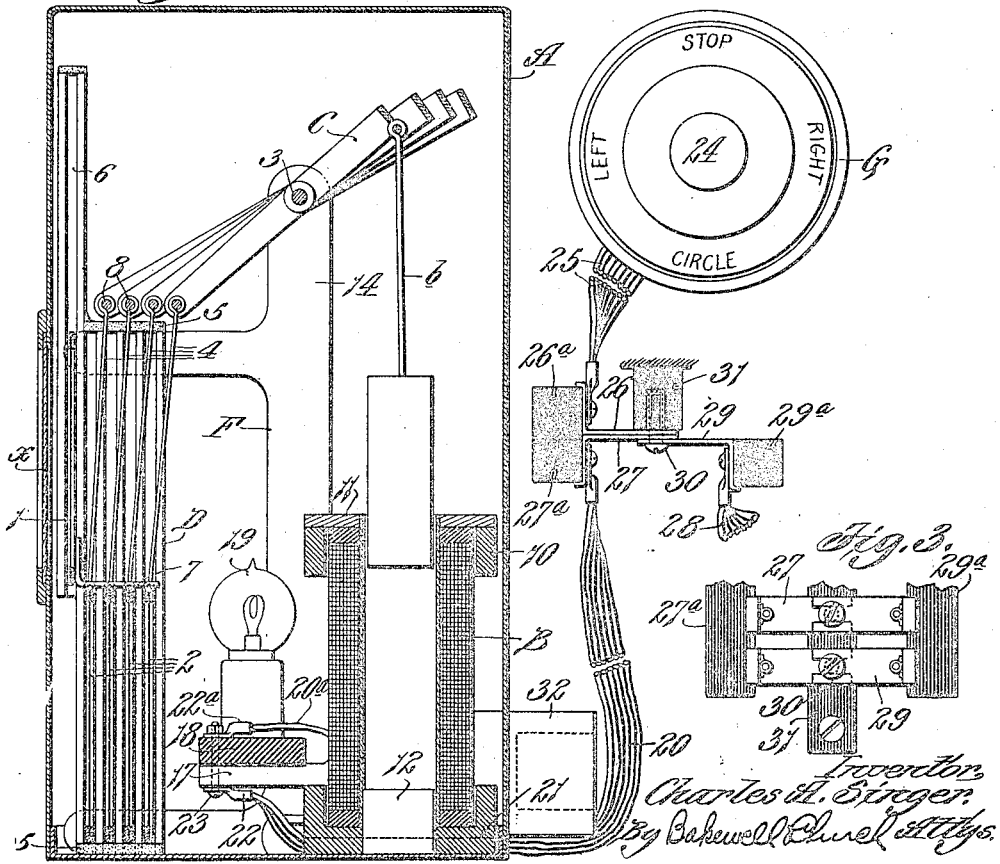

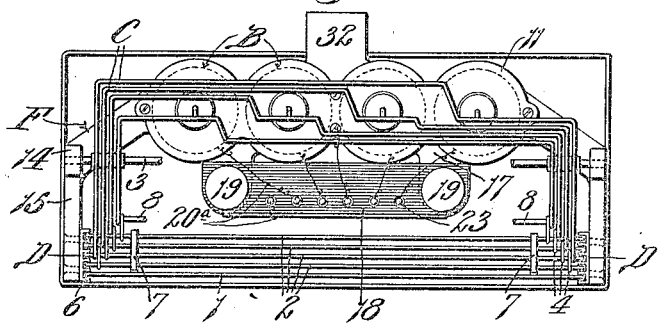

UNITED STATES PATENT OFFICE.

CHARLES A. SINGER, OF ST. LOUIS, MISSOURI, ASSIGNOR TO SINGER AUTO TRAFFIC SIGNAL COMPANY, OF ST. LOUIS, MISSOURI, A CORPORATION OF DELAWARE.

TRAFFIC-DIRECTING SIGNAL FOR VEHICLES.

1,240,380.  Specification of Letters Patent.  Patented Sept. 18, 1917.

Application filed September 27, 1915. Serial No. 52,904.

*To all whom it may concern:*

Be it known that I, CHARLES A. SINGER, a citizen of the United States, residing at St. Louis, Missouri, have invented a certain new and useful Improvement in Traffic-Directing Signals for Vehicles, of which the following is a full, clear, and exact description, such as will enable others skilled in the art to which it appertains to make and use the same.

This invention relates to traffic directing signals for vehicles, and has for its main object to provide a signal of the character mentioned that comprises a plurality of indicators or devices, one of which denotes that the vehicle will travel forwardly or in a straight path, and the others denoting proposed changes in the direction of travel or in the speed of the vehicle, the apparatus being so constructed that the indicator which denotes the normal direction of travel of the vehicle, or, in other words, a straight path, will disappear automatically whenever one of the other indicators comes into view and will reappear automatically after the previously operated indicator is rendered inoperative or disappears from view.

Another object is to provide a signal of the general type mentioned, in which the indicators that denote changes in the direction of travel or in the speed of the vehicle are governed by a single, manually-operable device, and the indicator that denotes the normal direction of travel of the vehicle is governed or controlled by the indicators previously mentioned in such a manner that it is always exposed to view, unless one or the other of said indicators is operative.

And still another object is to provide a traffic directing signal for vehicles of the general type described in my pending application Serial No. 41,101, filed July 21, 1915, in which certain parts of the apparatus are of a novel design that simplifies the construction and cost of manufacturing the apparatus and facilitates the installation of same on a vehicle. Other objects and desirable features of my invention will be hereinafter pointed out.

Figure 1 of the drawings is a front elevational view, partly broken away, of one of the housings in which one group of indicators is arranged.

Fig. 2 is a view illustrating the switch or the manually-operable device that governs the indicators, the wiring between said switch and the electrically-operated devices that actuate one group of indicators and also shows one group of indicators in vertical section.

Fig. 3 is a detail bottom plan view, illustrating the means that I prefer to use for connecting the wires leading from the switch with the wires that lead from the solenoids in the indicator housings at the front and at the rear of the vehicle.

Fig. 4 is a top plan view, illustrating one group of indicators and the mechanism for actuating same; and Fig. 5 is a perspective view, illustrating one of the castings that acts as a supporting frame for one group of indicators and the rockable members and solenoids that actuate same.

The complete apparatus comprises two sets or groups of similar indicators arranged so that they can be seen from the front and from the rear of the vehicle on which the signal is used, and electrically-operated devices are preferably employed for actuating said indicators. It is immaterial, however, so far as one feature of my present invention is concerned, whether the complete apparatus comprises two groups of indicators or only one group, and it is also immaterial what particular means is employed for actuating the indicators. I prefer to use indicators each of which consists of a member that contains a word, but this also is immaterial, as my broad idea consists in a traffic directing signal for vehicles that comprises a device which denotes that the vehicle will travel forwardly or in a straight path and other devices that are adapted to be rendered operative so as to give notice of a proposed change in the direction of travel or in the speed of the vehicle. In the apparatus herein shown the device that indicates that the vehicle will travel forwardly or in a straight path is normally operative, and the other indicating devices which denote proposed changes in the direction of travel or in the speed of the vehicle are normally inoperative, means being employed for causing the normally operative indicating device to disappear automatically whenever one of the other indicating devices is rendered operative and to reappear automatically whenever the said indicating device has been restored to its normal inoperative position.

As both sets or groups of indicators are of the same construction, I have herein illustrated only one set of indicators. Each group of indicators comprises a normally-operative indicator 1, and a plurality of normally inoperative indicators 2, the indicator 1 being provided with a word or other suitable indicia for denoting the normal direction of travel of the vehicle, such, for example, as the word "Straight", and the indicators 2 being provided with words or other suitable indicia for denoting proposed changes in the direction of travel and in the speed of the vehicle. For example, one of the indicators 2 may be provided with the word "Right", to indicate a turn to the right; another with the word "Left", to indicate a turn to the left; another with the word "Circle", to indicate a complete turn of the vehicle and the other with the word "Stop", to indicate that the vehicle will slow down or stop. It is immaterial how the indicators 1 and 2 are constructed, but I prefer to provide each indicator with a rectangular-shaped frame that surrounds a web having transparent portions that constitute the word or character on the indicator so that the word can be seen plainly at night when the illuminating means inside of the casing is operative. Said indicators are arranged in a housing A which is provided with a sight opening $x$, as shown in Fig. 1, so as to expose to view the indicator that is operative, and solenoids or other suitable electrically-operated devices B are arranged inside of said housing for actuating devices C that are operatively connected with the indicators 2, the devices C preferably consisting of yoke-shaped members oscillatingly mounted on a horizontally-disposed shaft 3 and connected by means of links 4 with indicators 2. The indicators 2 are normally arranged in the lower portion of the housing A, one behind the other, as shown in Fig. 2, and they are mounted in vertical grooves formed in guide members D, each of which is provided at its upper and lower ends with buffers 5 that limit the upward and downward movement of the indicators 2. Each of the indicators 2 is combined with a separate actuating device C and each of said actuating devices is controlled by a separate solenoid. The indicator 1 that denotes the normal direction of travel of the vehicle is arranged in vertically-disposed guideways 6 in the guiding members D, and said indicator 1 is arranged in such a position that it will be exposed to view through the sight opening $x$ in the casing A when all of the indicators 2 are depressed or in an inoperative position, as shown in Fig. 2. Various means may be employed for causing the indicator 1 to disappear or move out of alinement with the sight opening $x$ automatically whenever one of the indicators 2 is rendered operative and to reappear automatically whenever the indicator 2 is rendered inoperative, but the means that I prefer to use to accomplish this consists of one or more devices 7 that project rearwardly from the lower edge portion of the indicator 1 across the upper edges of the indicators 2, said device or devices 7 operating to normally hold the indicator 1 in alinement with the sight opening $x$. Whenever one of the indicators 2 is moved upwardly into operative position the upward pressure that it exerts on the device or devices 7 on the indicator 1 will cause said indicator 1 to move upwardly into an inoperative position out of alinement with the sight opening $x$. When the said indicator 2 moves downwardly, out of alinement with the sight opening $x$, gravity carries the indicator 1 back to its normal position, in alinement with said sight opening.

The yoke-shaped actuating devices C are nested together, as shown in Fig. 4, and the side pieces of each of the devices C have their front ends connected together by a rod 8 that passes through eyes or loops on the links 4 which join the indicators 2 to their coöperating actuating devices C. The core of each of the solenoids B is connected by means of a link $b$ or other suitable device to the particular actuating member C with which said solenoid coöperates, thereby causing one of the indicators 2 to move upwardly into operative position when its solenoid is energized and to move downwardly into an inoperative position when said solenoid is rendered inoperative. The solenoids B, the actuating members C and the guiding members D are carried by a casting F, which also supports the housing A, which housing is so designed that it can be slipped downwardly over said casting. Said casting F is provided with a base portion 9 that has a plurality of vertically-disposed sleeves or cylindrical-shaped portions 10 that receive the coils of the solenoids B, as shown in Fig. 2, the solenoids being held securely in operative position by means of a cover plate 11 that has openings through which the cores of the solenoids pass. At the lower end of each of the sleeves or cylindrical-shaped portions 10 is a plug 12, shown in Fig. 2, that projects upwardly into the coil of the solenoid that is arranged inside of said sleeve. The cover plate 11 is detachably connected to the solenoid carrying portion of the casting F by means of screws or other suitable fastening devices that project into threaded openings 13 in the casting, thereby enabling the apparatus to be assembled easily. Adjacent the ends of the base portion 9 of the casting F are vertically-disposed uprights or standards 14, in which the cross shaft 3 is journaled, and said standards are provided with forwardly-projecting arms 15 to which the guiding members D are connected by means of fastening devices that pass through openings 16 in said arms. Ears 17 that project forwardly from the base portion of the casting F serve to support a strip of fiber or other suitable insulating material 18 that carries one or more electric lamp bulbs 19 which illuminate the indicators at night. The wires 20 that form part of the electric circuits, in which the solenoids and the lamps 19 are arranged, lead into the housing A through slots or openings 21 in the underside of the base portion 9 of the casting F, and said wires are connected to contacts 22 on the underside of the insulating strip 18 which are in turn connected to contacts 22$^a$ on the upper side of said strip by means of bolts or other suitable fastening devices 23, the electric lamp bulbs and the coils of the solenoids being connected to the contacts 22$^a$ by means of short wires 20$^a$, as shown clearly in Fig. 2. The electric circuits are governed by a single switch that is arranged in such a position that it can be actuated easily by the driver or one of the occupants of the vehicle, said switch being constructed in the manner illustrated and described in my pending application previously referred to. Said switch, which is indicated by the reference character G in Fig. 2, is provided with a single controlling member 24 that is adapted to be moved into one position to cause the indicator 2 provided with the word "Left" to be rendered operative; into a different position to cause the indicator provided with the word "Right" to be rendered operative; into a different position to cause the indicator provided with the word "Circle" to become operative and into a different position to cause the indicator provided with the word "Stop" to become operative, but as said switch does not form part of my present invention, I have not herein illustrated the construction of same. The contacts of said switch are connected by means of wires 25 with contacts 26 on a bar or strip of insulating material 26$^a$, and the wires 20 are connected to contacts 27 on a bar or strip of insulating material 27$^a$. The wires 28, shown in Fig. 2, that lead to the solenoids and the electric lamp bulbs in the housing at the opposite end of the vehicle are connected to contacts 29 which are carried by a bar or strip of insulating material 29$^a$. The contacts 26, 27 and 29 are provided with bifurcated ends, as shown in Fig. 3, so that said contacts can be slipped over clamping screws 30, shown in Fig. 2, that are carried by a strip of insulating material 31 on some portion of the vehicle. For example, on the cowl of an automobile. By constructing the apparatus in this manner I am enabled to install it quickly and easily on a vehicle, owing to the fact that all of the wires that lead from one of the indicator housings are connected to a bar or strip 27$^a$; all of the wires that lead from the other indicator housing are connected to a bar or strip 29$^a$ and all of the wires that lead from the switch G are connected to a bar or strip 26$^a$, the contacts on said various bars consisting of flat, bifurcated members that can be slipped over the clamping screws 30 and arranged in superimposed relation, as shown in Fig. 2. The casting F is provided with a connecting portion 32, preferably a sleeve, that can be slipped over a bracket (not shown) on the vehicle and securely connected thereto by a set screw or other suitable device.

A traffic directing signal of the construction above described not only gives notice of proposed changes in the direction of travel and in the speed of the vehicle on which it is used, but it also gives notice of the normal direction of travel of the vehicle through one or more indicators that are always exposed to view when the vehicle is traveling forwardly or in a straight path. All of the indicators are controlled by a single, manually-operable device, and the indicator or indicators that denote the normal direction of travel of the vehicle are so arranged that they will disappear automatically and will reappear automatically without requiring any thought on the part of the person in charge of the signaling apparatus. The apparatus can be manufactured at a low cost, on account of its simple construction, and it can be installed easily on a vehicle by any person of ordinary intelligence.

Having thus described my invention, what I claim, and desire to secure by Letters Patent, is:

1. A traffic-directing signal for vehicles, comprising a housing provided with a sight opening, a plurality of indicators arranged inside of said housing for designating proposed changes in the speed or direction of travel of the vehicle, said indicators being free to move independently of each other, means for causing one or the other of said indicators to be exposed to view through said sight opening, and a separate and distinct indicating device in said housing that is normally exposed to view through said sight opening and which is shifted into and out of alinement with said sight opening by the movement of said indicators, thereby causing said device to disappear automatically whenever one of said indicators is rendered operative and to reappear automatically after said indicator has been rendered inoperative.

2. A traffic-directing signal for vehicles, comprising a housing provided with a sight opening, a plurality of independently-movable indicators that are normally arranged in an inoperative position inside of said housing, means for enabling said indicators to be operated or rendered operative, and a separate and distinct indicating device in said housing that is normally held in alinement with said sight opening, said device being moved automatically into an inoperative position by the movement of any of said indicators into alinement with said sight opening.

3. A traffic-directing signal for vehicles, comprising a housing provided with a sight opening, a plurality of indicators arranged inside of said housing in such a manner that they are normally hidden from view, a separate and distinct indicating device in said housing that is normally in alinement with said sight opening, and means whereby said indicating device will be moved out of alinement with said sight opening whenever one or the other of said indicators is moved into position to be seen through said opening.

4. A traffic-directing signal for vehicles, comprising a housing provided with a sight opening, a plurality of indicators arranged inside of said housing in parallel relation to each other and in such a manner that they are normally hidden from view, a separate and distinct indicating device arranged in said housing so that it can be normally seen through said sight opening, and a portion on said indicating device that extends transversely of said indicators and which is adapted to be engaged by any one of said indicators that is rendered operative, thereby causing said indicating device to disappear automatically from view when any one of said indicators is rendered operative.

5. A traffic-directing signal for vehicles comprising a housing provided with a sight opening, a plurality of indicators arranged in the lower portion of said housing out of alinement with said sight opening and in parallel relation with each other, a separate and distinct indicating device in said housing that is normally arranged in alinement with said sight opening, and means on said device that extends across the upper edges of said indicators so as to cause said indicating device to be held in its normal position and to move automatically out of alinement with said sight opening whenever one or the other of said indicators is rendered operative.

6. A traffic-directing signal for vehicles comprising a housing provided with a sight opening, a plurality of vertically-disposed indicators arranged in the lower portion of said housing in parallel relation to each other at a point below said sight opening, a separate and distinct indicating device arranged inside of said housing at a point in alinement with said sight opening and provided with a portion that is adapted to be engaged by any one of said indicators that is moved into alinement with the sight opening, and an operating mechanism for said indicators.

7. A traffic-directing signal for vehicles comprising a housing provided with a sight opening, a plurality of slidingly mounted indicators arranged inside of said housing operating members for said indicators, solenoids for actuating said members, a casting that carries said housing and which is provided with portions that support said solenoids and said operating members, guides on said casting in which said indicators slide, and a portion on said casting that is adapted to be connected to a supporting structure, the housing being so constructed that it can be slipped over said casting.

8. In a signaling device of the character described, a housing provided with a sight opening, a supporting casting that carries said housing and which is adapted to be connected to a supporting structure, a plurality of integral sleeves on said casting that are adapted to receive solenoids, a removable cover plate for holding said solenoids in position, a pair of vertical standards or uprights on said casting for supporting a cross shaft, and forwardly-projecting arms on said standards that are adapted to support guiding members.

9. A traffic-directing signal for vehicles comprising a housing provided with a sight opening, a plurality of indicators arranged inside of said housing, electrically-operated devices in said housing for actuating said indicators, a switch for controlling said devices, an insulating member provided with contacts to which the wires from said switch are connected, a separate insulating member provided with contacts to which the wires from said electrically-operated devices are connected, and an insulating member provided with binding screws for clamping said contacts together.

10. A traffic-directing signal for vehicles comprising a housing provided with a sight opening, a plurality of indicators arranged inside of said housing, electrically-operated devices in said housing for actuating said indicators, a switch for controlling said devices, an insulating member provided with contacts to which the wires from said switch are connected, a separate insulating member provided with contacts to which the wires from said electrically-operated devices are connected, said contacts having bifurcated ends and being connected to said insulating members in such a manner that they will contact with each other when said insulating members are arranged in superimposed relation, and an insulating member on the vehicle provided with binding screws that are adapted to enter the bifurcated portions of said contacts and thus securely clamp them together.

In testimony whereof I hereunto affix my signature in the presence of two witnesses, this twenty fifth day of September 1915.

CHARLES A. SINGER.

Witnesses:
    WELLS L. CHURCH,
    GEORGE BAKEWELL.